United States Patent Office 3,547,978
Patented Dec. 15, 1970

3,547,978
PROCESS FOR THE PRODUCTION OF ARYL
BENZOATE ESTERS
Anita H. Lewin, Staten Island, N.Y., and Theodore Cohen, Pittsburgh, Pa., assignors to Research Corporation, New York, N.Y., a nonprofit corporation of New York
No Drawing. Filed Sept. 2, 1966, Ser. No. 576,813
Int. Cl. C07c 69/78
U.S. Cl. 260—476                                        6 Claims

ABSTRACT OF THE DISCLOSURE

Aryl benzoate esters are prepared by heating a mixture of cuprous benzoate (or cuprous oxide and benzoic anhydride) and an aryl halide in the presence of a solvent.

The present invention relates to a method for the preparation of aromatic esters. In one specific aspect, it relates to a novel method for the preparation of aryl benzoate esters.

Aryl benzoate esters are generally prepared by the reaction of a benzoyl chloride and a phenol and are high boiling liquids useful as plasticizers. We have discovered a novel method for the preparation of aryl benzoate esters which utilizes an aryl halide as the principal starting material rather than a phenol and which can be used to prepare the corresponding substituted or unsubstituted phenol compound.

It is, therefore, a principal object of the present invention to provide a new method for the preparation of aryl benzoate esters.

It is a further object of the invention to provide a new method for the preparation of phenol compounds.

Our invention is a process for the preparation of an aryl benzoate ester which comprises heating a mixture of a cuprous benzoate and an aryl halide in the presence of a solvent, and recovering the resultant aryl benzoate ester from the reaction mixture.

In one approach, cuprous oxide is heated at reflux with a solution of benzoic acid in a water immiscible solvent in order to azeotrope the water of reaction as it is formed. The water is separated and the solvent returned or further solvent added to the system as necessary. When the reaction has been completed as indicated by the cessation of water formation, the reactant aryl halide is added directly to the reaction mixture without isolating the cuprous benzoate intermediate. The reaction mixture is then heated further in an atmosphere of nitrogen or other inert gas to prepare the aryl benzoate ester.

In a more preferred approach, a mixture of a benzoic anhydride, cuprous oxide and the reactant aryl halide are heated in the presence of an anhydrous organic solvent unreactive with either the starting materials or the product under process conditions. In order to promote the reaction, solvents boiling above 100° C. are preferred. The heating is preferably effected with stirring and in an oxygen-free or inert atmosphere in order to minimize product degradation.

The reaction mixture from either approach is worked up using conventional methods. Preferably, the reaction mixture is decomposed by pouring into dilute aqueous acid and the product recovered by extraction with a water immiscible organic solvent. The extract is carefully washed with dilute aqueous base to remove any acid present. The product esters are obtained after drying and evaporation of the extraction solvent.

Our invention is further illustrated by means of the following examples:

EXAMPLE I

A mixture of 10 mmoles of benzoic anhydride and 10 mmoles of cuprous oxide and 2.5 mmoles of the aryl halide in a ca. 5 ml. of diethylene glycol dimethyl ether was heated at reflux with stirring under nitrogen for 40 hours. The mixture reaction was poured into dilute aqueous acid and extracted with methylene chloride. The extract was washed with aqueous sodium bicarbonate and then with water, dried and the solvent evaporated.

Using this approach, p-anisyl benzoate was obtained in 85% yield from p-bromoanisole, m-nitrophenyl benzoate was obtained in 62% yield from m-nitrobromobenzene and p-nitrophenyl benzoate was obtained in 34% yield from p-bromonitrobenzene. The actual yield in the latter case was higher but the ester hydrolyzed readily when exposed to aqueous alkali during work up.

EXAMPLE II

Cuprous benzoate was preformed by heating together 2.44 g. (20 mmoles) of benzoic acid with 1.56 g. (11 mmoles) of cuprous oxide in xylene. The water of reaction was distilled off as formed and additional xylene was added as necessary. When evolution of water ceased, 2.5 mmoles of the reactant aryl halide was added and the mixture heated for 48 hours under nitrogen.

Using this approach, p-tolyl benzoate was obtained in 94 and 79% yields starting with p-iodotoluene and p-bromotoluene, respectively. α-Naphthyl benzoate was obtained in 51% yield starting with α-bromonaphthalene.

The principal side reaction in this approach, the reduction of the reactant aryl halide to the corresponding arene compound, is attributed to the presence of moisture in the reaction mixture. A small amount of coupling also occurs to form biaryl products.

Without limiting our invention to any particular theoretical mode of operation, cuprous benzoate is believed to be formed using either approach and to react with the aryl halide to form the corresponding aryl benzoate ester. The process of the present invention is effected at atmospheric pressure and under conditions in which rearrangement of reactants and products does not occur. Thus, the reactant aryl halide yields the corresponding phenol without rearrangement when subjected to the treatment with cuprous benzoate followed by conventional alkaline hydrolysis. Any unreacted benzoic anhydride or acid present during product work up or formed on hydrolysis can be recovered as the corresponding benzoic acid.

The method of the present invention is particularly applicable to the preparation of phenyl and naphthyl benzoate esters by the reaction of cuprous benzoate with phenyl or naphthyl halides. The reactant halides may also be described as 6–10 carbon atom-containing carbocyclic aromatic halides. The esterification process of the present invention followed by hydrolysis converts these halides to the corresponding phenols and naphthols.

The above-offered discussion and examples are for the purpose of illustration only and are not intended to limit the scope of the present invention. Other variations in the method of the present invention will suggest themselves to those skilled in the art. Our invention is as claimed.

We claim:
1. A process for the preparation of a phenyl benzoate ester which comprises heating a mixture of cuprous benzoate and a phenyl bromide or iodide in the presence of a solvent, and recovering the resultant phenyl benzoate ester from the reaction mixture.
2. A process according to claim 1 wherein the cuprous benzoate is preformed in situ by heating a benzoic acid with cuprous oxide until the evolution of water ceases.

3. A process for the preparation of a phenyl benzoate ester which comprises heating cuprous oxide, a benzoic anhydride, and a phenyl bromide or iodide in the presence of a solvent, and recovering the resultant phenyl benzoate ester from the reaction mixture.

4. A process for the preparation of a naphthyl benzoate ester which comprises heating a mixture of cuprous benzoate and a naphthyl bromide or iodide in the presence of a solvent, and recovering the resultant naphthyl benzoate ester from the reaction mixture.

5. A process according to claim 4 wherein the cuprous benzoate is preformed in situ by heating a benzoic acid with cuprous oxide until the evolution of water ceases.

6. A process for the preparation of a naphthyl benzoate ester which comprises heating cuprous oxide, a benzoic anhydride, and a naphthyl bromide or iodide in the presence of a solvent, and recovering the resultant naphthyl benzoate ester from the reaction mixture.

References Cited

Theilheimer: Org. Syn., v. 17, p. 114, reaction #274 (Nesmeyanov), Manabe. Kogyo Kagakee Fasshi 67, pp. 1141–4 (1964), translation is 10 pages.

Bacon et al.: Quarterly Review (London), 1965, pp. 119–122.

Morrison et al.: Organic Chemistry (1959), pp. 483–5.

LORRAINE A. WEINBERGER, Primary Examiner

E. J. GLEIMAN, Assistant Examiner